US006116747A

United States Patent [19]

Grawemeyer et al.

[11] Patent Number: 6,116,747

[45] Date of Patent: Sep. 12, 2000

[54] FLASHLIGHT

[75] Inventors: John V. Grawemeyer; John E. Grawemeyer; Chris A. Ostby, III, all of Louisville; John R. Tichenor, Fairfield; David E. Weidekamp, Louisville, all of Ky.

[73] Assignee: Design Guidance Inc., Louisville, Ky.

[21] Appl. No.: 09/241,494

[22] Filed: Feb. 1, 1999

Related U.S. Application Data

[60] Provisional application No. 60/084,584, May 7, 1998.

[51] Int. Cl.[7] ............................ B25B 23/18; F21V 33/00; F21V 21/00; H04M 1/22; F21L 4/00

[52] U.S. Cl. .......................... 362/119; 362/120; 362/109; 362/191; 362/396

[58] Field of Search .................................... 362/119, 120, 362/109, 190, 191, 208, 396, 403; 7/165

[56] References Cited

U.S. PATENT DOCUMENTS

| | | | |
|---|---|---|---|
| 1,352,708 | 9/1920 | Waegel | 362/396 |
| 2,594,908 | 4/1952 | Gaulke et al. . | |
| 2,791,676 | 5/1957 | Cote . | |
| 3,919,541 | 11/1975 | Chad . | |
| 4,480,295 | 10/1984 | Shuster . | |
| 5,144,546 | 9/1992 | Burdi | 362/191 |
| 5,168,780 | 12/1992 | Van Gennep . | |
| 5,211,468 | 5/1993 | Jeng . | |
| 5,636,918 | 6/1997 | Lott | 362/208 |
| 5,667,185 | 9/1997 | Maglica | 362/191 |
| 5,690,416 | 11/1997 | Van Gennep | 362/191 |
| 5,720,542 | 2/1998 | Birge, Jr. et al. . | |
| 5,727,346 | 3/1998 | Lazzarini et al. | 42/103 |
| 5,785,408 | 7/1998 | Tseng | 362/119 |
| 5,915,825 | 6/1999 | Weister | 362/191 |

*Primary Examiner*—Sandra O'Shea
*Assistant Examiner*—Bryan P. Stanley
*Attorney, Agent, or Firm*—Theresa Fritz Camoriano; Camoriano and Associates

[57] ABSTRACT

A flashlight and a tool are held in a housing that rotates relative to the tool, so that the flashlight remains in a relatively fixed position even when the tool is rotated. This allows the user to illuminate a work area and to rotate the tool without causing changes in the work area lighting.

13 Claims, 5 Drawing Sheets

FLASHLIGHT

This application claims priority from U.S. Provisional Application S.N. 60/084,584, filed May 7, 1998.

BACKGROUND

The present invention relates to a device for holding a flashlight and a rotating tool, and more particularly, to a device for holding a flashlight in a relatively stationary position while the associated tool is being rotated.

Rotating tools, such as ratchet drive extension bars and screwdrivers, are frequently used to secure fasteners in hard to illuminate locations, making it difficult for the user to see the target work area. To address this problem, lights have been attached to the rotating tool to provide lighting to the work area. For example, U.S. Pat. No. 3,919,541 issued to Chao, discloses a device that allows a lamp to be attached to the shaft of a screwdriver. The light from the lamp illuminates the work area, but the lamp also rotates with the tool, thereby changing where the light is directed based on the position of the shaft of the tool.

An alternative means for lighting a work area when using a rotating tool is described in U.S. Pat. No. 5,720,542, issued to Birge, Jr. et al. The '542 patent provides a stationary housing for the rotating tool and attaches a flashlight to the housing. Because the housing does not rotate when the tool is rotated, the light from the flashlight remains in a fixed position. However, the housing must remain stationary to ensure that the focus of the light will not be altered.

SUMMARY OF THE INVENTION

The present invention is a flashlight attachment that is secured to a rotating tool, such as a ratchet drive extension bar or a similar tool, to illuminate a work area for the user. The attachment houses both the tool and the flashlight, and is designed to rotate relative to the tool, so that the flashlight remains in an essentially fixed position even when the tool is rotated. This allows the user to illuminate the work area and to rotate the tool without causing changes in the work area lighting.

DETAILED DESCRIPTION OF THE INVENTION

Figure 1:
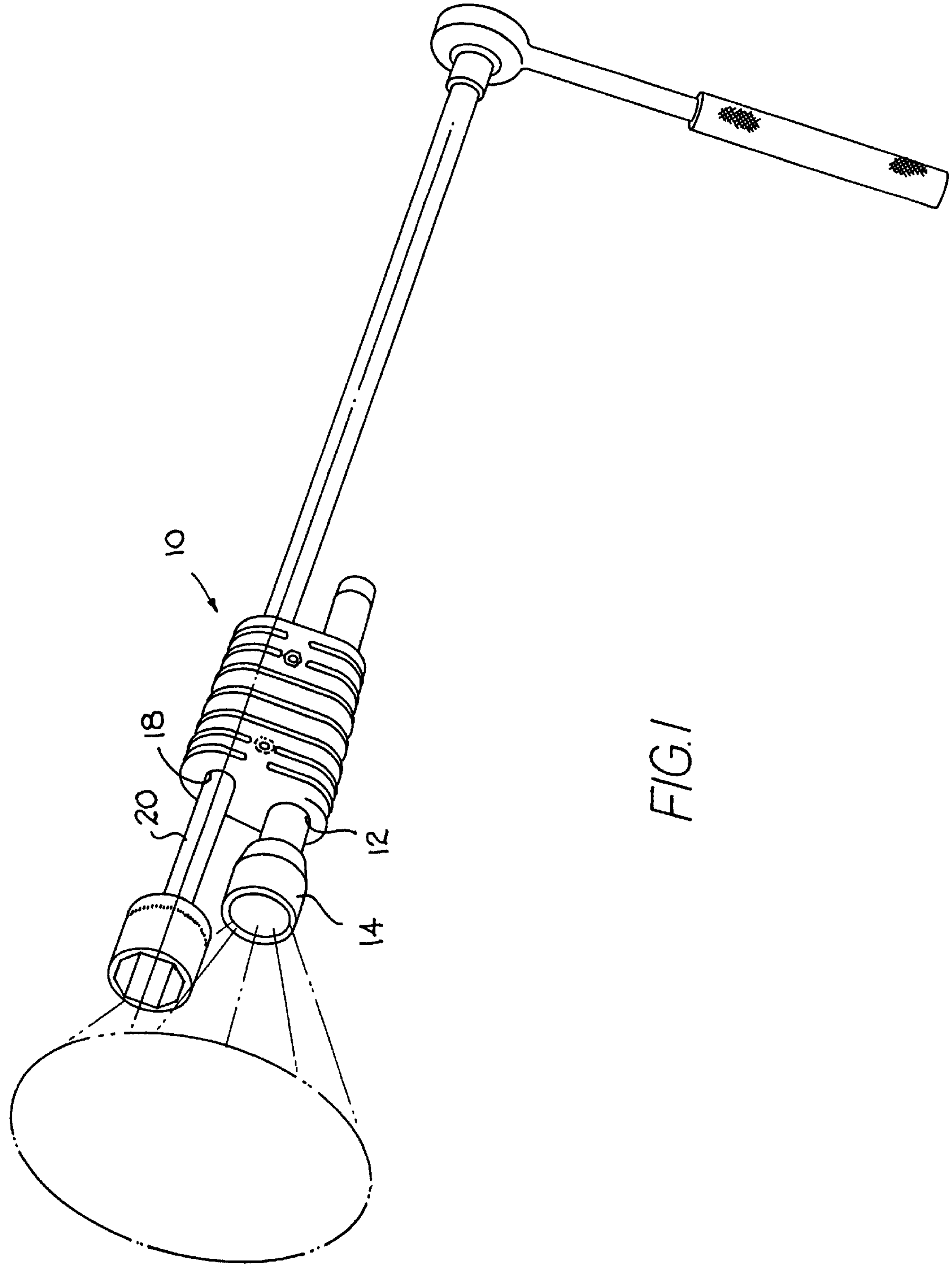
FIG. 1 is a perspective view of a preferred embodiment of the flashlight attachment of the present invention shown with a flashlight and a ratchet drive extension bar.
Figure 2:
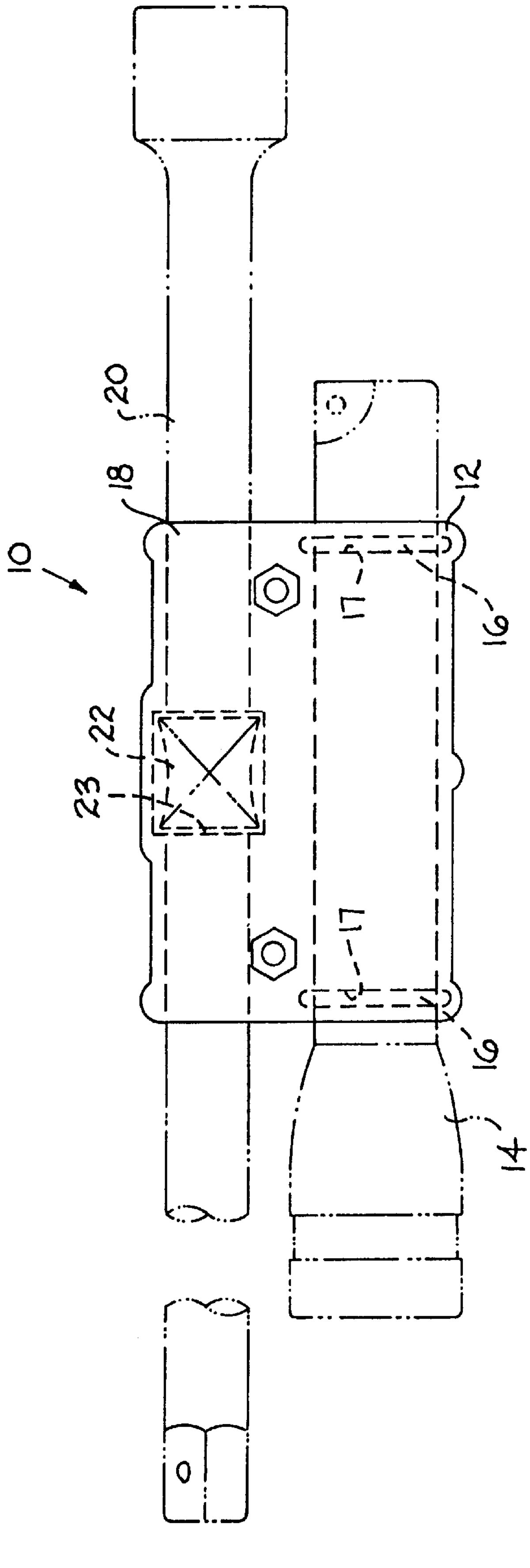
FIG. 2 is a side view of the flashlight attachment of FIG. 1, with the flashlight and the ratchet drive extension bar included in phantom, except the decorative exterior ribbing is removed.
Figure 3:
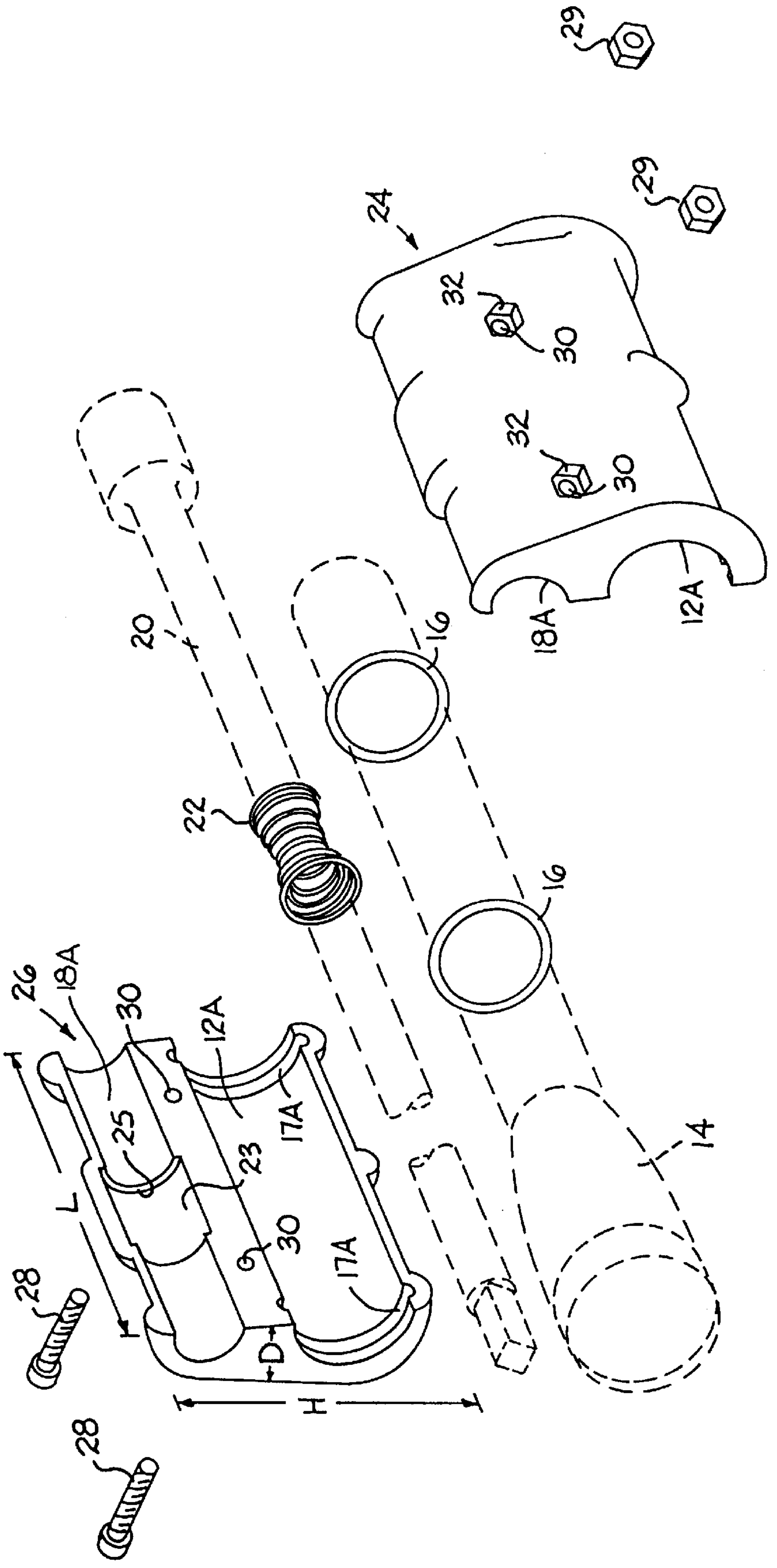
FIG. 3 is an exploded perspective view of the flashlight attachment of FIG. 2.

The present invention is a flashlight attachment that is secured to a ratchet drive extension bar or a similar tool to illuminate a work area for the user. FIGS. 1–3 show a first preferred embodiment of the flashlight attachment 10. As shown in FIG. 1, the attachment 10 is a housing that defines a first bore 12 that accommodates a small (preferably AA-battery-sized or equivalent) flashlight 14, and a second bore 18 for receiving a tool 20, such as a ratchet drive extension bar.

Figure 4:
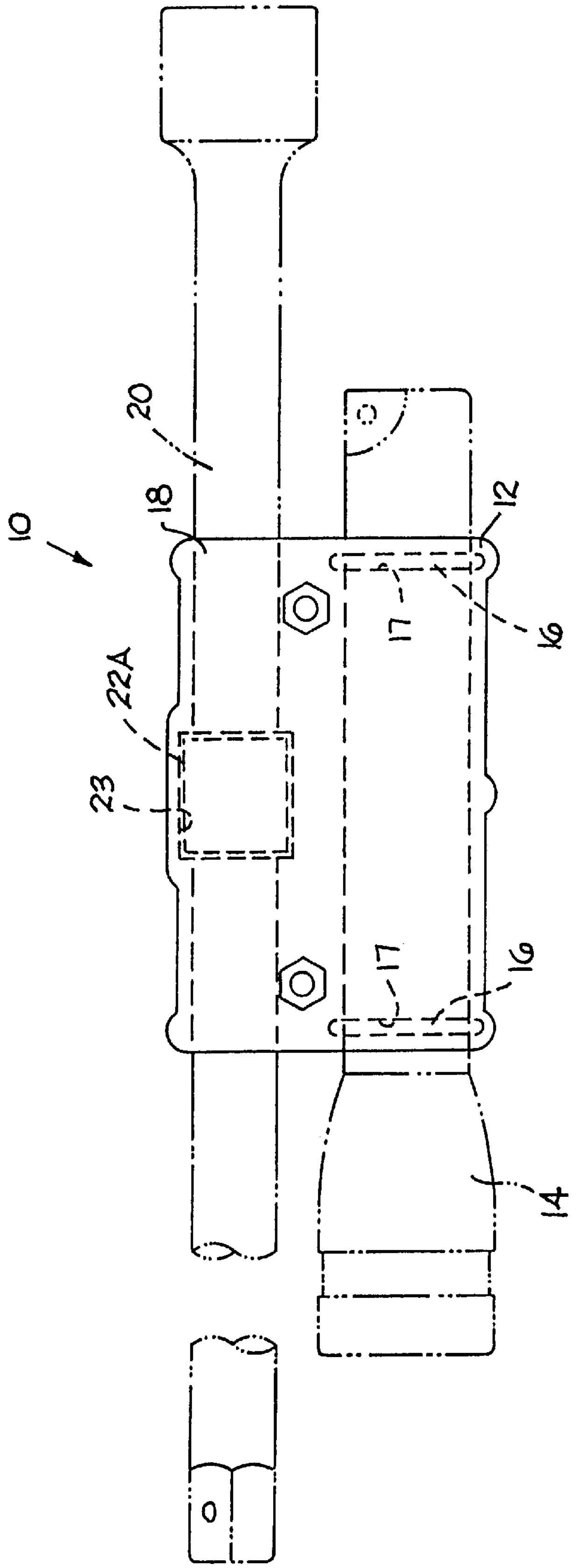
FIG. 4 is a side view of an alternative embodiment of the flashlight attachment of FIG. 2 that uses a bushing to grip the tool.

As best shown in FIGS. 2, 3 and 4, the flashlight 14 is held in the first bore 12 by first gripping members 16, for example, rubber O-rings, that are housed in first recesses, or indentations, 17 defined by the attachment housing 10, as will be further described. The tool 20 is held in the second bore 18 by a second gripping member 22, such as a spring (shown in FIGS. 2 and 3) or a bushing 22A (shown in FIG. 4). The gripping member 22 is seated in a second recess 23 defined by the attachment housing 10, the recess 23 being wide enough to allow the gripping member 22 to rotate relative to the attachment 10, so the housing does not exert a compressive force on the gripping member 22.

Referring now to FIG. 3, the attachment 10 is comprised of two identical shell portions: a front shell portion 24 and a back shell portion 26. Screws 28 are used to fasten these two shell portions 24, 26 together, clamping the shell portions together in abutting relationship, as shown in FIG. 1, each of the screws 28 being secured by nut 29. The front and back shell portions 24, 26 are preferably manufactured of a molded plastic, but they may be made of other materials as well.

Each shell portion 24, 26 defines first and second semi-circular bores 12A, 18A. Thus, when the two shell portions 24, 26 are fastened together to form the attachment 10, the semi-circular bores 12A, 18A of the front portion are aligned with the semi-circular bores 12A, 18A defined by the back shell portion 26 to form the first and second essentially cylindrical bores 12, 18, each having a nominal diameter, for receiving the flashlight 14 and tool 20, respectively. The front shell portion 24 and the back shell portion 26 also each define two holes 30 for receiving the screws 28 used to attach the shell portions 24, 26 to each other. The shell portions 24, 26 also define recesses 32 for receiving the heads 28 and nuts 29 of each screw.

As shown on the back shell portion 26, two semi-circular indentations 17A are positioned along the first bore 12A of each shell portion. When the two shell portions 24, 26 are fastened together, the semi-circular indentations 17A form cylindrical indentations 17, having an enlarged diameter relative to the nominal diameter of the first bore 12. The two rubber O-rings 16 that hold the flashlight are positioned in these indentations 17.

The front and back shell portions 24, 26 also define a recess 23, lying along the second bore 18, and having an enlarged diameter relative to the nominal diameter of the second bore 18. The second gripping member 22 that secures the tool 20 is positioned in the recess 23 between the front and back shell portions 24, 26. Preferably, the second gripping member 22 is a spring having an hourglass shape, i.e. the spring is coiled to have a narrower diameter at the middle than at either end. The middle section coils are used to hold the tool 20. The diameter of these coils must be large enough to allow the tool 20 to pass through the coils, but small enough that the coils engage the tool 20, preventing longitudinal movement of the tool 20 without the application of pressure. The spring's larger diameter end coils retain the spring 22 in the recess 23 by engaging the ends 25 of the recess 23. To retain the spring within the recess 23 while allowing the spring 22 to rotate freely, the diameter of the end coils must be larger than the nominal diameter of the second bore 18, but smaller than the diameter of the recess 23, so that, when the shell portions are clamped tightly together, the spring is loose in the recess 23 but is retained in the recess. Since the spring remains loose in the recess, the gripping force the spring can exert on a tool is entirely independent of the housing.

The attachment 10 is assembled by placing the O-rings 16 in the semi-circular indentations 17A of the back shell portion 26, and the spring 22 in the recess 23. The front shell 24 is then aligned with the back shell 26, and the shell portions 24, 26 are secured with the screws 28 and nuts 29. To use the attachment 10, a user slides the flashlight 14 into the first bore 12 and slides the tool 20 into the second bore 18. The flashlight 14 is gripped and held on the attachment 10 by the O-rings 16, and the tool 20 is retained on the attachment 10 by the spring 22. In this description, the preferred tool is a ratchet extension bar for a socket. The fit between the spring 22 and the tool 20 is tight enough to prevent the attachment 10 from moving longitudinally, or sliding, relative to the tool unless the user intentionally applies force to cause it to move. However, the spring 22 freely rotates relative to the attachment 10 as the tool 20 rotates. Because of the weight of the flashlight 14, the attachment 10 will rotate so the flashlight 14 remains below the tool 20, even when the tool 20 is rotated manually, pneumatically, electrically, or otherwise. In other words, the tool 20 can rotate while the position and focus of the flashlight 14 remain essentially unchanged. For subsequent uses, the flashlight 14 can be exchanged by pulling the flashlight out of the first bore 12 and sliding a new flashlight into position. Similarly, the tool 20 can be exchanged by pulling the tool out of the second bore 18 and sliding a new tool into position. It is not necessary to separate the shell portions 24, 26 to make these substitutions.

EXAMPLE 1

In a preferred embodiment of the attachment housing 10 in FIGS. 2 and 3, each of the front and back shell portions 24, 26 is made of plastic, and has a length "L" of about 3", a height "H" of about 2⅛", and a depth "D" of about ⅝". The first gripping members 16 are #115 O-rings; the second gripping member 22 is a spring made of 0.047" diameter music wire and has a length of about 0.7", and middle coils with an inner diameter of about 0.484" and end coils with an inner diameter of about 0.526" and an outer diameter of about 0.620"; and two 8–32×⅝" pan head phillips machine screws 28, and two 8–32 hex nylock nuts 29, are used to secured the back shell 26 to the front shell 24. The attachment housing 10 is proportioned to hold a AA-battery flashlight 14, and a ⅜" ratchet drive extension bar 20.

The first and second bores 12, 18 are essentially parallel with the top (horizontal) edge, the first bore 12 having a horizontal axis approximately 1½" from the top edge and having a diameter of about ¾", and the second bore 18 having a horizontal axis approximately ½" from the top edge and having a diameter of about 33/64". The indentations 17 along the first bore 12 have vertical centerlines approximately 3/16" from the side edges. Each first indentation 17 has a diameter of approximately 29/32" and a width of approximately 7/64". The second recess 23 along the second bore 18 has a vertical centerline at the midpoint of the length of the attachment, which for this attachment is about 1½" from the side edges, and has a diameter of about 11/16" or 0.6875 and a length of approximately ¾". Two 11/64" diameter holes 30 extend through the front and back shells 24, 26, and are centered about ⅞" from the top edge and about 13/32" from the side edges. Each hole 30 has a recess 32 of on the outer face of the shell portions 24, 26 to accommodate the heads of the screws 28 or the nuts 29. The difference between the outer diameter of the ends of the spring of 0.620" and the inner diameter of the second recess of 0.6875" leaves a gap of 0.0675" between the spring and the recess, so the housing exerts no compressive force on the spring and does not affect the gripping force between the spring and the tool.

EXAMPLE 2

In an alternative embodiment, shown in FIG. 4, the attachment housing 10 is made as in Example 1, except the second gripping member 22A is a plastic bushing, having a length of about 0.7", an inner diameter of about 0.48", and an outer diameter of about 0.6". The bushing 22A expands as the tool 20 is pushed through and then the bushing grips the tool 20 while rotating freely within the second recess 23. The gap of 0.0875" between the 0.6" outside diameter of the bushing and the 0.6875" inside diameter of the second recess again means that the housing exerts no compressive force on the bushing and does not affect the gripping force between the bushing and the tool.

Figure 5:
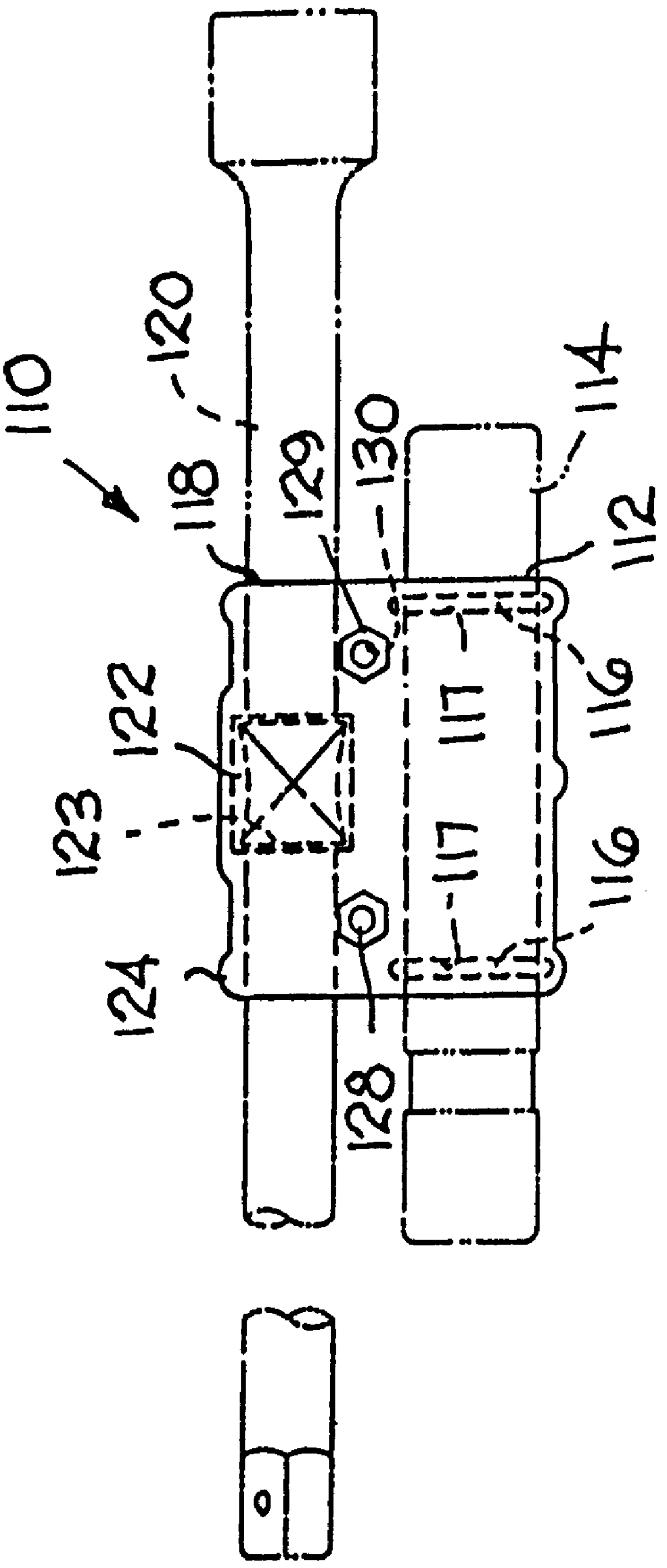
FIG. 5 is a side view of an alternative embodiment of the flashlight attachment of FIG. 1, modified to hold a smaller flashlight and smaller ratchet drive extension bar included in phantom.

FIG. 5 shows a third embodiment of the present invention where the attachment is constructed to accommodate a smaller (AAA-battery-sized or equivalent) flashlight 114. This second attachment housing 110 is identical to the embodiment described above, with the housing shell portions 124 again being mirror images of each other, except that the diameters of the first and second bores 112, 118, the O-rings 116, and the spring 122 have been reduced to accommodate the smaller flashlight 114 and tool 120. As described above, the O-rings 116 are seated in first indentations 117 defined by the attachment housing 110, and the spring 122 is seated in a second recess 123 defined by the attachment housing 110. Two screws 128 pass through holes 130, 130 defined by the shell portions 124 to secure the shell portions 124 together. These screws 128 are secured by nuts 129. The front and back shell portions 124 preferably define recesses (not shown) for receiving the head of the screw 128 and the nut 129.

EXAMPLE 3

In a preferred embodiment of the attachment housing 110 in FIG. 5, the attachment is similar to attachment housing 10 in Example 1, except the shell portions 124 have a length of about 1½", a height of about 1½", and a depth of about 11/16". The first gripping members 116 are #014 O-rings; the second gripping member 122 is a spring made of 0.031" diameter music wire, and has a length of about ½", and middle coils with an inner diameter of about 9/32" and end coils with inner diameter of about ⅜"; the screws 128 are two 6–32×½" pan head phillips machine screws; and the nuts 129 are two 6–32 hex nylock nuts. The attachment housing 110 is proportioned to hold a AAA-battery flashlight 114, and a ¼" ratchet drive extension bar 120.

The first circular bore 112 has a diameter of about 33/64" with a horizontal axis approximately 1 1/16" from the top edge, and the second circular bore 118 has a diameter of about 5/16" with a horizontal axis approximately 5/16" from the top edge. The first indentations 117 have vertical centerlines approximately ⅛" from the side edges, and each has a diameter of approximately ⅝" and a width of approximately 5/64". The second recess 123 has a diameter of about 7/16" and a length of approximately ½", with a vertical centerline approximately ¾" from the side edges. Two 5/32" diameter holes 130 extend through the front and back shells 124, 126. Both holes are the same distance from the top edge and a distance from the side edge. The attachment housing 110 is assembled as described for attachment housing 10 in Example 1.

It will be obvious to those skilled in the art that modifications may be made to the preferred embodiments described herein without departing from the scope of the present invention.

What is claimed is:

1. A device for mounting a flashlight on the shaft of a rotating tool, comprising:

a housing defining first and second bores, each of said bores having a nominal diameter and at least one enlarged diameter portion, a plurality of gripping members, each capable of exerting a gripping force on a member to be gripped, wherein a first of said gripping members is mounted in the enlarged diameter portion of said first bore, and a second of said gripping members is mounted in the enlarged diameter portion of said second bore, wherein the gripping force of said second gripping member is independent of the housing.

2. A device for mounting a flashlight on the shaft of a rotating tool as recited in claim 1, wherein at least one of said gripping members is an elastic ring having an outside diameter greater than the nominal diameter of the bore in which it is mounted.

3. A device for mounting a flashlight on a rotating tool, comprising:

a housing, including shell portions fastened together to define first and second bores extending through said housing, the first bore being substantially cylindrical for receiving a flashlight, and the second bore having a nominal diameter, and defining an enlarged diameter portion; and a tool gripping member mounted loosely in said enlarged diameter portion, said tool gripping member having an outside diameter larger than the nominal diameter of the second bore and smaller than the enlarged diameter portion so as to leave a gap between the outside diameter of said tool gripping member and the inside of said enlarged diameter portion, said tool gripping member being trapped in said enlarged diameter portion while being loose within said enlarged diameter portion, so that, when said tool gripping member grips a tool, it permits the tool to rotate freely relative to the housing while retaining the tool in the housing.

4. A device for mounting a flashlight on a rotating tool as recited in claim 3, wherein said tool gripping member is a spring.

5. A device for mounting a flashlight on a rotating tool as recited in claim 3, wherein said first bore defines two enlarged diameter portions, and wherein O-rings are mounted in those first bore enlarged diameter portions for releasably gripping a flashlight.

6. A device for mounting a flashlight on a rotating tool as recited in claim 5, and further comprising a flashlight mounted in said first bore.

7. A device for mounting a flashlight on a rotating tool, comprising:

a housing defining first and second bores extending through said housing, the first bore being substantially cylindrical for receiving a flashlight, and the second bore having a nominal diameter, being substantially cylindrical, and defining an enlarged diameter portion; and a tool gripping member mounted loosely in said enlarged diameter portion, said tool gripping member having a diameter larger than the nominal diameter of the second bore and smaller than the enlarged diameter, so that, when said tool gripping member grips a tool, it permits the tool to rotate freely relative to the housing while retaining the tool in the housing, wherein said spring has first and second ends and a middle and is wound so that it has a larger diameter on the ends than in the middle.

8. A device for mounting a flashlight on a rotating tool as recited in claim 7, and further comprising a tool shaft mounted in said second bore and gripped by said gripping member.

9. A device for mounting a flashlight on a rotating tool, comprising:

a housing defining first and second bores extending through said housing, the first bore being substantially cylindrical for receiving a flashlight, and the second bore having a nominal diameter, being substantially cylindrical, and defining an enlarged diameter portion; and a tool gripping member mounted loosely in said enlarged diameter portion, said tool gripping member having a diameter larger than the nominal diameter of the second bore and smaller than the enlarged diameter, so that, when said tool gripping member grips a tool, it permits the tool to rotate freely relative to the housing while retaining the tool in the housing, and wherein said first bore defines two enlarged diameter portions, and wherein O-rings are mounted in those first bore enlarged diameter portions for releasably gripping a flashlight, and further comprising a flashlight mounted in said first bore, and wherein said tool gripping member is a spring having first and second ends and a middle, and wherein said spring is wound so that it has a larger diameter on the ends than in the middle, and further comprising a tool shaft mounted in said second bore and gripped by said gripping member.

10. A device for mounting a flashlight on the shaft of a rotating tool, comprising:

a housing defining first and second bores, each of said bores having a nominal diameter and at least one enlarged diameter, a plurality of gripping members, wherein one of said gripping members is mounted in each of said enlarged diameter portions, and wherein at least one of said gripping members is a spring having first and second ends and a middle, wherein the spring has an enlarged diameter at the ends and a smaller diameter in the middle.

11. A device for mounting a flashlight on the shaft of a rotating tool, comprising:

a housing defining first and second bores, each of said bores having a nominal diameter and at least one enlarged diameter, a plurality of gripping members, wherein one of said gripping members is mounted in each of said enlarged diameter portions, wherein at least one of said gripping members is an elastic ring mounted in said first bore and having an outside diameter greater than the nominal diameter of said first bore, and wherein at least one of said gripping members is a spring having first and second ends and a middle, said spring being mounted in said second bore and having an enlarged diameter at the ends and a smaller diameter in the middle.

12. A device for mounting a flashlight on the shaft of a rotating tool as recited in claim 11, and further comprising a flashlight mounted in said first bore, said flashlight being releasably gripped by said elastic ring.

13. A device for mounting a flashlight on the shaft of a rotating tool as recited in claim 12, and further comprising a tool shaft mounted in said second bore and gripped by said spring.

* * * * *

UNITED STATES PATENT AND TRADEMARK OFFICE

CERTIFICATE OF CORRECTION

PATENT NO. : 6,116,747

DATED : September 12, 2000

INVENTOR(S) : John V. Grawemeyer; John E. Grawemeyer; Chris A. Ostby, III; John R. Tichenor; David E. Weidekamp It is certified that error appears in the above-indentified patent and that said Letters Patent is hereby corrected as shown below:

Please change title "Flashlight" to --Flashlight Attachment--.

Signed and Sealed this

Twenty-fourth Day of April, 2001

Attest:

NICHOLAS P. GODICI

*Attesting Officer*

*Acting Director of the United States Patent and Trademark Office*